Nov. 2, 1926.

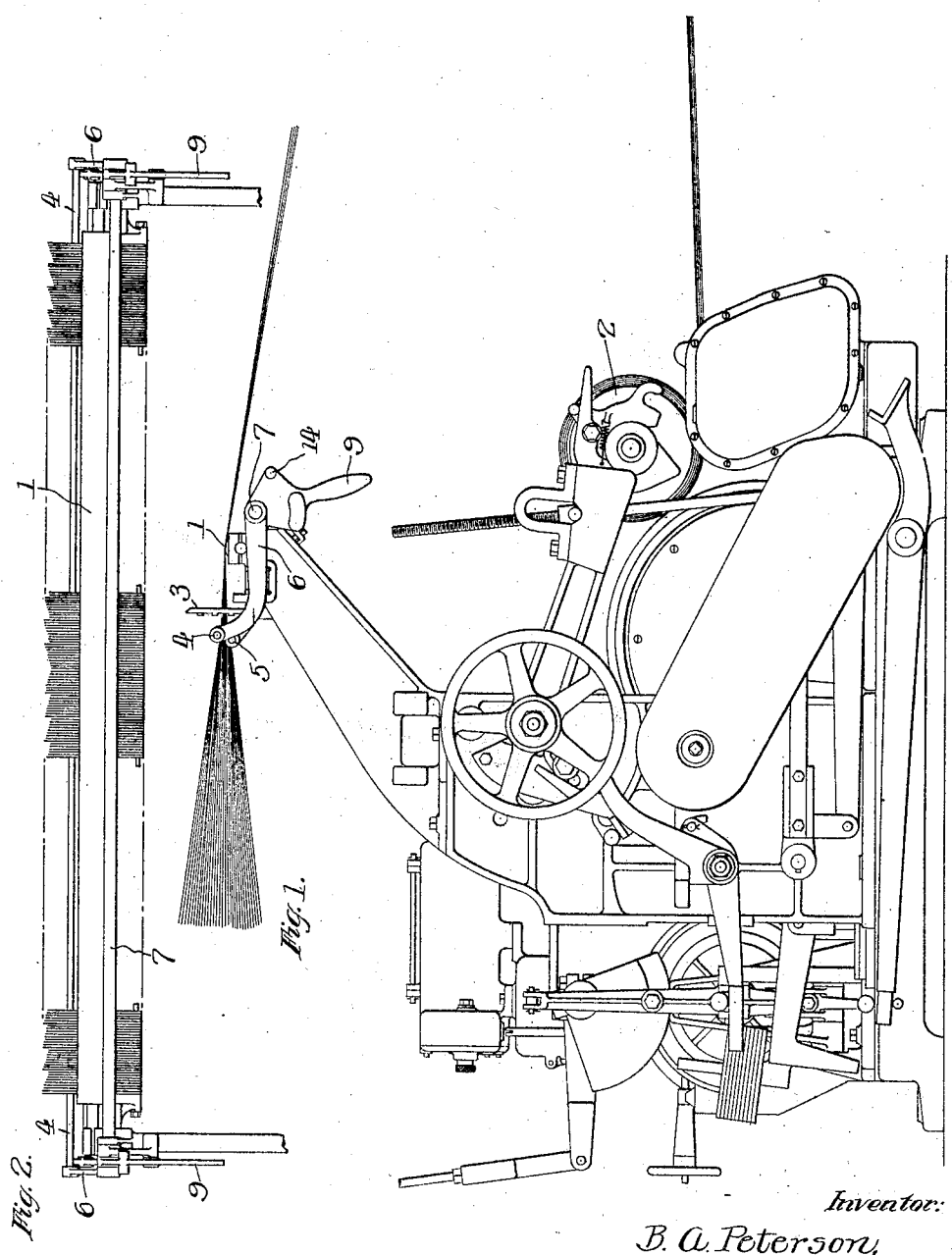

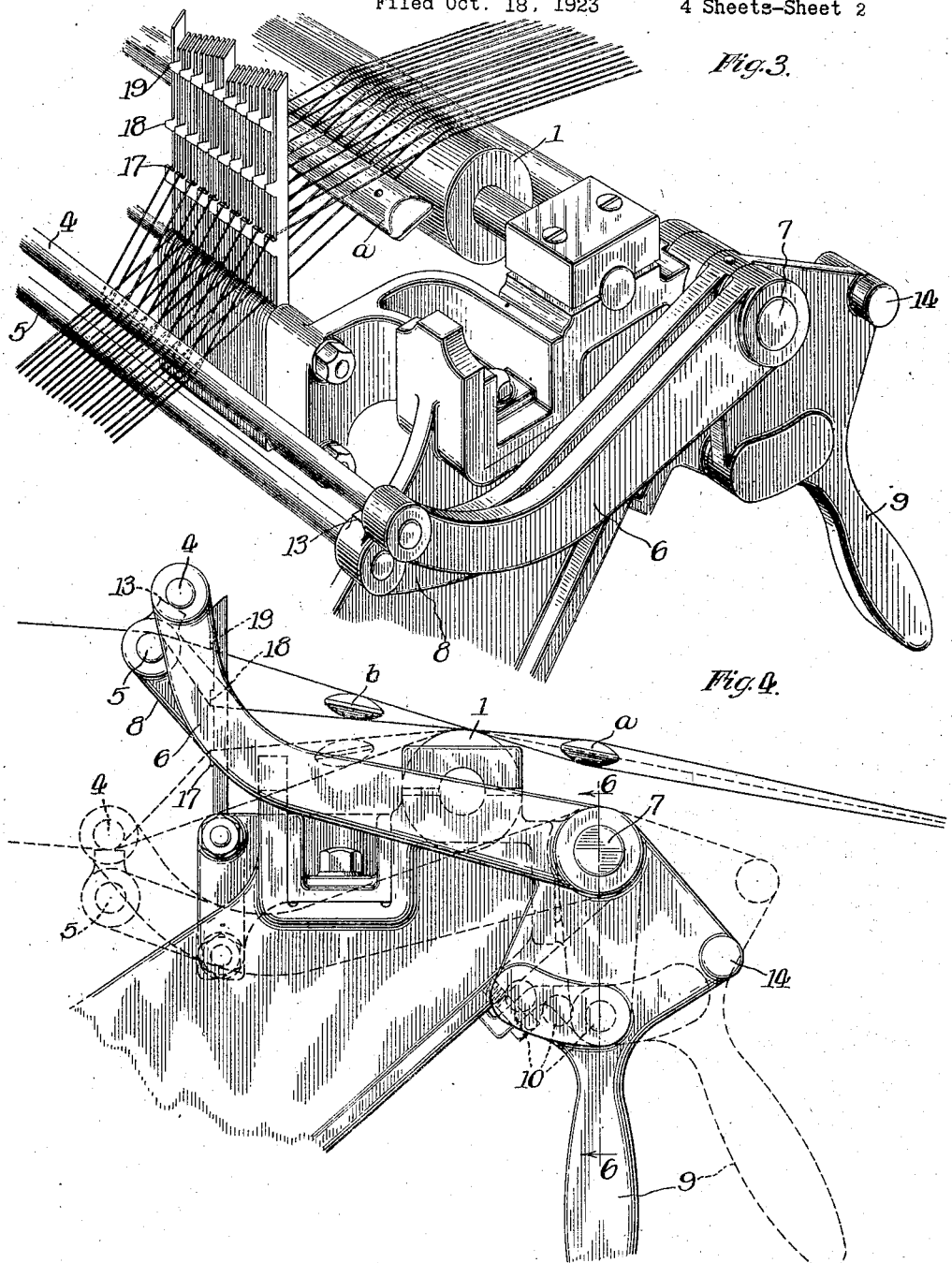

B. A. PETERSON

LEASE FORMER

Filed Oct. 18, 1923  4 Sheets-Sheet 3

1,605,277

Inventor:
B. A. Peterson,
By Churdahl Parker Railson
Attys.

Nov. 2, 1926.                          1,605,277
B. A. PETERSON
LEASE FORMER
Filed Oct. 18, 1923        4 Sheets-Sheet 4
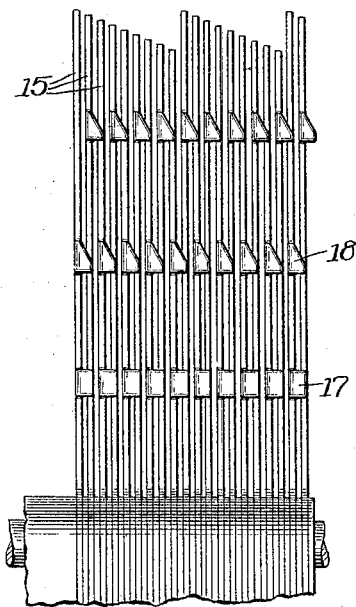
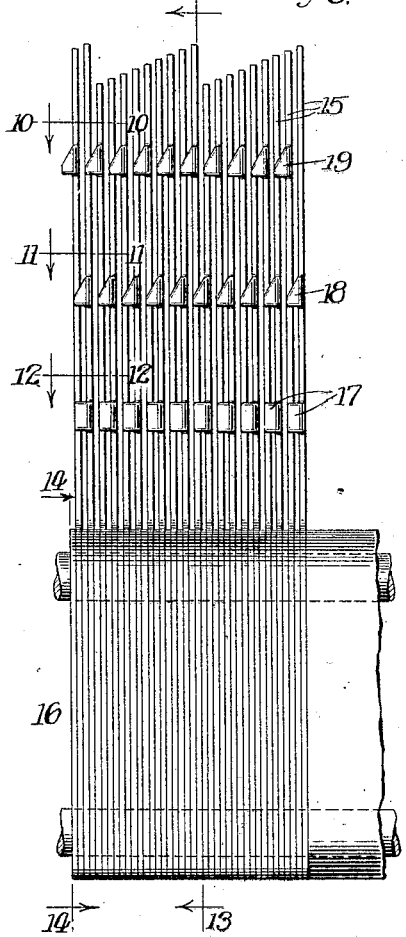
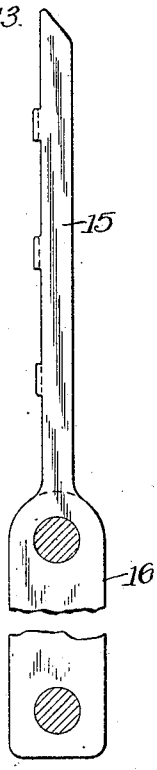
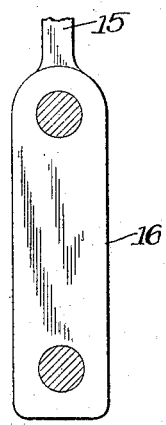
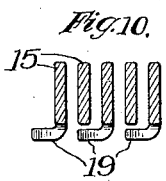
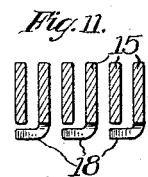
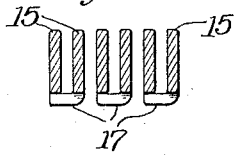
Inventor:
B. A. Peterson,
By Churchill Parker Carlson
Attys.

Patented Nov. 2, 1926.

1,605,277

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

LEASE FORMER.

Application filed October 18, 1923. Serial No. 669,204.

This invention relates to an improved means for forming a lease in the threads being wound in a ball warper or other machine.

Figure 5:
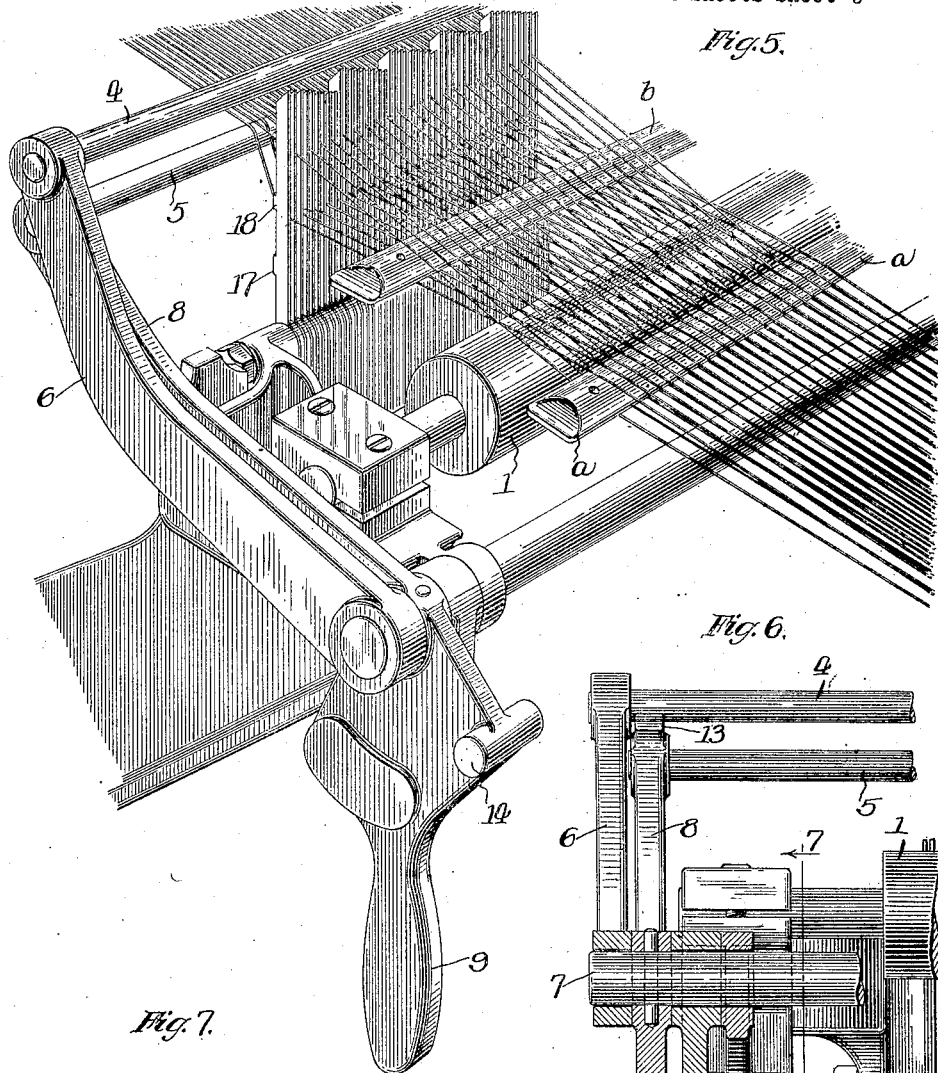
Figure 6:
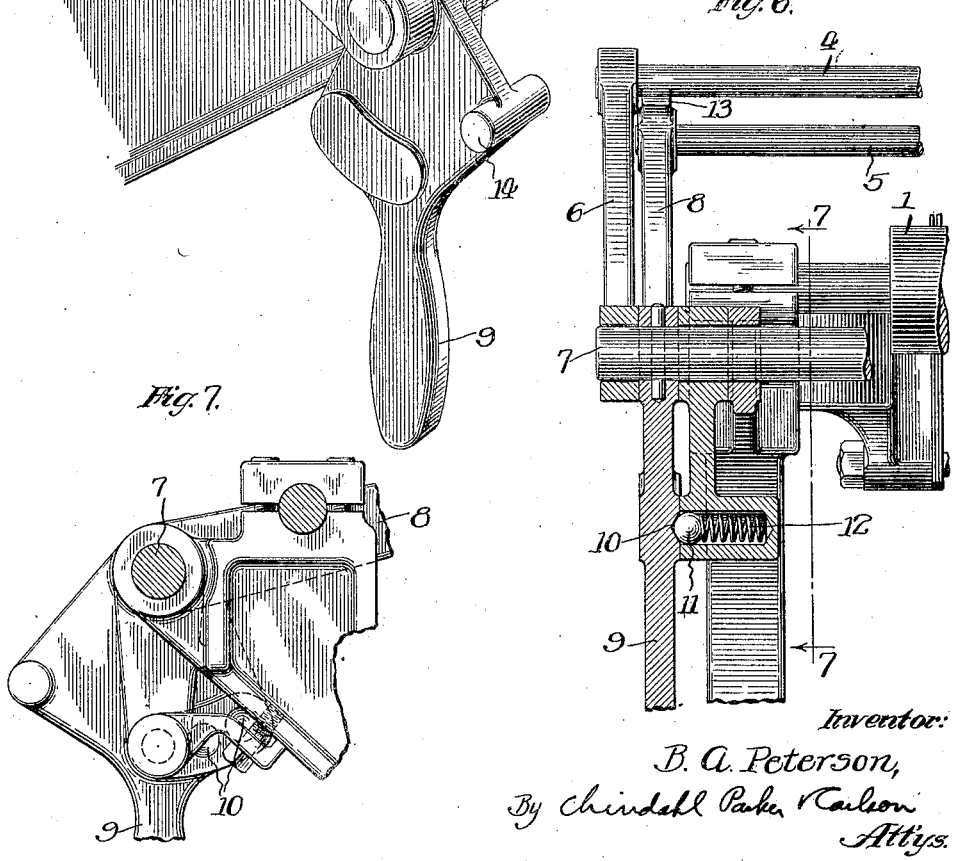
Figure 7:
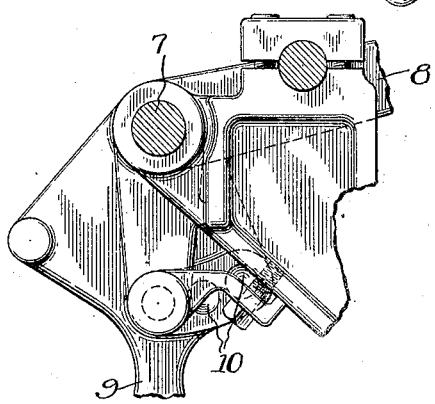

In the accompanying drawings Figure 1 is a side elevation of a ball warper provided with a lease former embodying the features of my invention. Fig. 2 is a fragmental front elevation of the lease former. Fig. 3 is a fragmental perspective view showing the first step in the operation of forming a lease. Fig. 4 is a fragmental end view showing in dotted lines the position illustrated in Fig. 3 and in full lines the second step in the operation of forming the lease. Fig. 5 is a fragmental perspective view showing the second step in the operation of forming the lease. Fig. 6 is a fragmental front view. Fig. 7 is a sectional view taken in the plane of line 7—7 of Fig. 6. Figs. 8 to 14 are detail representations of the comb structure in which Figs. 10, 11, 12, 13 and 14 respectively, are cross sections on the planes of lines 10—10, 11—11, 12—12, 13—13 and 14—14 of Fig. 8.

Inasmuch as a lease former embodying my invention may be employed in connection with warpers of various forms, it will be unnecessary to describe the construction of the machine shown in Fig. 1, it being merely noted that the sheet of threads extends over a guide roll 1 and thence to suitable guide means (not shown) which direct the threads to the beam 2.

The lease former comprises a comb 3 and two guide rods 4 and 5 between which the threads extend before reaching the comb. These rods are arranged to be used in raising and lowering the threads with reference to the comb in forming the lease. The rod 4 is supported by arms 6 (Fig. 2) that are pivotally mounted upon the ends of a rock shaft 7 which is suitably mounted in the framework of the warper forwardly of the roll 1. The guide rod 5 is carried by arms 8 which are fixed upon the shaft 7. Means is provided for yieldably holding the rod 5 in one of three positions. While this means may be of any preferred character, I have herein shown each arm 8 as having a handle portion 9 having three locking recesses 10 (Figs. 4 and 6) to receive a spring detent 11 herein illustrated as being in the form of a ball backed by an expansive spring 12, said detent being carried by a part which is rigidly secured to the framework of the machine.

The guide rod 4 is normally supported upon lugs 13 on the ends of the arms 8. On the handle portion 9 are stop lugs 14 which serve to support the arms 6 when the latter are swung forwardly from the operative position shown in Fig. 1.

The comb 3 is open at the top. It is formed of splits 15 rigidly secured to a back 16. The comb is fixed in the framework of the warper and extends between and longitudinally of the roll 1 and the guide rods 4 and 5.

While the present invention may be employed in connection with a creel of any suitable type, it is preferably used in connection with a creel of the character disclosed in application Serial No. 611,213, filed January 8, 1923, by Howard D. Colman. Said creel is V-shaped, the creel being adapted to support the supply yarn masses in vertical rows or columns, there being nine supply yarn masses in each column.

The splits or teeth of the comb 3 are so arranged as to indicate the proper locations for the respective threads. As shown in Figs. 2 and 3, the spaces or dents of the comb are divided into sections, there being as many sections as there are columns of supply yarn masses, and each section containing as many spaces as there are supply yarn masses in a column. The sections are differentiated from each other by making the teeth or splits of each section of regularly increasing length, the shortest tooth being at the inner end of the section. The space between the two middle sections is made slightly wider than the other spaces, as said middle section receives two threads.

Referring now more particularly to Figs. 8 to 12, the comb is provided with three longitudinal parallel series of angular lugs. The lugs 17 of the lowermost series are formed upon alternate splits and are bent at right angles to bridge or close alternate spaces in the comb. It will be seen that the lugs 17 limit the depth to which the warp threads may descend in alternate spaces in the comb.

The lugs 18 of the middle series are formed upon the same splits as those which carry the lugs 17, but the upper edges of the lugs 18 are bevelled and said lugs 18 are spaced away from the adjacent splits so that warp threads may slip past the lugs 18 and descend until arrested by the lugs 17. After having slipped down past the lugs 18 the warp threads are prevented by said lugs 18 from rising above the horizontal plane of the lugs 18. As shown in Fig. 11, each lug 18 overlaps the adjacent split. As indicated in Fig. 8, the lower edges of the lugs 18 are not inclined upwardly, and hence threads which have passed below said lugs cannot subsequently rise above them.

The lugs 19 of the upper series are like the lugs 18, but are formed upon the splits which lie between those which carry the lugs 17 and 18. The lugs 19 allow threads to slip past them, but prevent said threads from thereafter rising above the horizontal plane of the lugs 19.

Assuming that the guide rod 4 has been swung forwardly, so that the arms 6 rest upon the lugs 14: In the operation of connecting a new set of supply yarn masses with the beam 2 the operative collects the threads of each column of supply yarn masses into a bunch, and draws each bunch of threads over to the warper in regular succession, beginning with the column which is nearest the warper at, say, the right hand side of the creel. The operative lays in the middle space of the comb the lowermost thread of the bunch that comes from the column of cheeses nearest the warper, the remaining threads of said bunch being laid in the comb in regular succession toward the right. The threads of the next column of cheeses are then laid into the next section of the comb, and so on. After all the threads from the right-hand side of the creel have been deposited in the comb, the threads from the other side of the creel are brought forward and placed in the comb, after which the rod 4 is swung back into its normal position (see Fig. 1) in which it overlies the threads. The threads are then drawn forward and connected to the warp beam 2 in the usual manner.

The correct placing of the threads in the comb 3 is facilitated by reason of the fact that there is an individual comb section for each bunch of threads, that there are just enough spaces in each section to accommodate the threads in a bunch, and that the teeth are of graduated length. When laying threads in the comb, the longest tooth of each section serves as a stop in positioning the bunch of threads that belong in the next adjacent section.

Threads of a bunch can be readily laid in their respective spaces in the comb, as the threads "fan out" or diverge from the operative's hand, the bunch of diverging threads being inclined in the same general direction as the upper edge of the comb section. If a thread be missing from a bunch, there will be a vacant space in the comb section, thus immediately bringing the matter to the attention of the operative.

Inasmuch as the thread from the lowest supply yarn mass in a column extends through the shallowest space in its section, and so on progressively, a vacant space occurring in the comb upon a stoppage of the warper indicates to the operative the location of the supply yarn mass the thread of which is missing, thus expediting the work of piecing up broken threads.

When it is desired to form a lease in the threads, the operative depresses the threads by operating one of the handles 9 so as to place the threads in the position shown in Fig. 3. It will be seen that every other thread is at the bottom of the comb, the alternate threads being held up by the lugs 17. Into the shed thus formed a lease rod *a* is inserted between the comb and the guide roll 1 and drawn forwardly over the guide roll into the position represented in Fig. 4. The operative then raises the guide rods 4 and 5 into the position illustrated in Figs. 4 and 5, whereby those threads which were at the bottom of the comb rise until arrested by the lugs 19, the alternate threads rising until stopped by the lugs 18. Into the shed thus formed between the comb and the guide roll 1 a lease rod *b* is inserted. The lease rods *a* and *b* are then replaced with the usual tapes. The leasing operation having been completed, the guide rods 4 and 5 are returned to their central normal position illustrated in Fig. 1, wherein they hold the threads clear of the lugs 17 and 18, and winding resumed.

Various changes may be made in the construction herein disclosed without departing from the spirit and scope of the invention defined in the appended claims.

I claim as my invention:

1. In a warper, the combination of a leasing comb, a pair of arms pivoted forwardly of the leasing comb and extending rearwardly, a thread guiding rod carried by said arms rearwardly of the comb, another pair of arms pivoted on the axis of the first mentioned arms and extending rearwardly, a thread guiding rod carried by the second mentioned pair of arms and normally lying above the first mentioned rod and rearwardly of the comb, the second pair of arms being arranged to swing to carry the second mentioned guide rod to a position forwardly of the leasing comb, the second guide rod normally resting upon the first mentioned pair of arms, and a handle connected to the first mentioned pair of arms for raising and lowering both rods.

2. In a warper, the combination of a leasing comb, a pair of arms pivoted forwardly of the leasing comb and extending rearwardly, a thread guiding rod carried by said arms rearwardly of the comb, another pair of arms pivoted forwardly of the comb and extending rearwardly, a thread guiding rod carried by the second mentioned pair of arms and normally lying above the first mentioned rod and rearwardly of the comb, the second pair of arms being arranged to swing to carry the second mentioned guide rod to a position forwardly of the leasing comb, the second guide rod normally resting upon the first mentioned pair of arms, and means for raising and lowering both rods.

3. The combination of an open top leasing comb having teeth providing spaces to receive threads, and three longitudinal series of lugs formed on said teeth, the lugs of the series nearest the back of the comb serving to close alternate spaces in the comb, the lugs of the other two series being adapted to permit threads to pass them in moving toward the back of the comb but limiting movement of the threads away from the back of the comb, the lugs of the last mentioned two series alternating in position, each lug of the last mentioned two series being spaced away from but overlapping the next adjacent split, and means for moving threads up and down in the spaces of the comb.

4. An open top leasing comb having teeth providing spaces to receive threads, and three longitudinal series of lugs formed on said teeth, the lugs of the series nearest the back of the comb serving to close alternate spaces in the comb, the lugs of the other two series being adapted to permit threads to pass them in moving toward the back of the comb but limiting movement of the thread away from the back of the comb, the lugs of the last mentioned two series alternating in position, each lug of the last mentioned two series being spaced away from but overlapping the next adjacent split.

5. A leasing comb open at the top and having teeth which are differentiated into sections by differences in the length of the teeth, the shorter teeth of a section being at one end of the section, and means on the comb intermediate the upper and lower ends of the teeth for differentially limiting the depth to which alternate threads may descend and for differentially limiting the height to which alternate threads may rise.

6. The combination of a leasing comb, a guide roll forwardly of the comb and two thread guiding rods supported for movement up and down rearwardly of the comb, the upper guide rod being arranged to be shifted to a position in front of the guide roll.

In testimony whereof, I have hereunto affixed my signature.

BURT A. PETERSON.